United States Patent [19]
Fujioka

[11] Patent Number: 4,629,292
[45] Date of Patent: Dec. 16, 1986

[54] SMALL TELEPHOTO ZOOM LENS

[75] Inventor: Yoshisato Fujioka, Higashikurume, Japan

[73] Assignee: Ricoh Company, Ltd., Tokyo, Japan

[21] Appl. No.: 817,174

[22] Filed: Jan. 9, 1986

Related U.S. Application Data

[63] Continuation of Ser. No. 566,436, Dec. 28, 1983, abandoned.

[30] Foreign Application Priority Data

Dec. 28, 1982 [JP] Japan .................. 57-227280

[51] Int. Cl.$^4$ .................................. G02B 9/64
[52] U.S. Cl. ........................... 350/427; 350/423
[58] Field of Search ............. 350/423, 427, 429, 430

[56] References Cited

U.S. PATENT DOCUMENTS 4,395,092  7/1983  Itoh ........................ 350/427
4,439,017  3/1984  Yamaguchi .................. 350/427

Primary Examiner—John K. Corbin
Assistant Examiner—P. M. Dzierzynski
Attorney, Agent, or Firm—Oblon, Fisher, Spivak, McClelland & Maier

[57] ABSTRACT

This invention relates to a four-group-lens zoom lens which is small in size and has a high magnification changing rate of which zoom ratio is 4. The zoom lens comprises a magnification changing system in which a first group, a second group and a third group have positive, negative and positive refractive powers, respectively, and a fourth group in the form of a relay lens. It is advantageous to make the focal length of lenses in the first group small in order to miniaturize the magnification changing system. In addition, it is advantageous that the relay lens be made small in the focal length and made small in telephone ratio, in order to miniaturize the whole zoom lens. In order to make the telephoto ratio small, it is advantageous to divide the fourth group lens into the front group and rear group to impart a positive refractive power to the front group and a negative refractive power to the rear group but a difficulty occurs in correction of aberrations, and therefore, a positive refractive power is imparted even to the rear group.

6 Claims, 20 Drawing Figures

SMALL TELEPHOTO ZOOM LENS

This application is a continuation of application Ser. No. 566,436, filed Dec. 28, 1983 now abandoned.

BACKGROUND OF THE INVENTION

1. Field of the Invention

This invention relates to a small-sized telephoto zoom lens.

2. Description of the Prior Art

It has been an earnest desire for zoom lenses for still cameras and video cameras to be usable with mobility. However, particularly the telephoto zoom lens tends to increase its weight as well as dimension, resulting in a difficulty in portability. If the zoom ratio and aperture ratio are made greater, such tendency further increases contrary to the wish for the mobility.

The zoom lens can be miniaturized and light-weigted effectively by (1) decreasing the telephoto ratio, (2) reducing the diameter of the front lens, (3) reducing the number of lenses constituting a lens system and the like. However, in (1) if the telephoto ratio is decreased, the aberration is deteriorated; in (2) if the diameter of the front lens is reduced, the relative illumination tends to reduce; and in (3) if the number of lenses is reduced, the aberration is deteriorated and the aperture ratio is reduced, causing an increase in difficulty of design.

SUMMARY OF THE INVENTION

The zoom lens in accordance with the present invention is composed of four lens groups, a first group, a second group and a third group being a magnification changing system, and a fourth group being a relay lens. To miniaturize the zoom lens, it is effective to miniaturize the magnification changing system comprising said first to third groups and in addition to reduce the telephoto ratio of the relay lens in the fourth group.

If the focal length of the fourth group is decreased, the magnification changing region of the magnification changing system comprising the first to third groups is made larger in the enlarged side than the reduced side. To this end, it is necessary to come the second group and third group closer to each other in the longest focal length. Therefore, it has to be designed so that the principal point at the rear of the second group lens is biased toward the image (on the side of the third group lens).

That is to say, the first group lens is constructed by arranging, from the object side, a cemented converging lens system comprising singles lenses of negative and positive or positive and negative, and a positive single lens, and is moved for focusing.

The second group comprises, in order from the object side, a positive lens, a negative lens comprising a cemented biconcave negative lens, and a negative single lens, wherein the rear principal point is one-sided towards the image, which is the so-called variater lens group which in magnification changing, moves on the optical axis to principally convert the focal length.

The third group comprises a converging lens in which a positive single lens and a negative single lens are cemented, which is the so-called compensator lens group which compensates and maintains constant variation of a position of the image plane caused by movement of the second group lens on the optical axis in synchronous with the movement of the second group, the locus of movement thereof being concave towards the object.

The fourth group arranged next to the magnification changing system comprising the first to third groups comprises the arrangement, in order from the object, of a positive single lens with a convex surface directed towards the object, a fourth group F composed of a negative single lens and a fourth group R which comprises the arrangement of a positive single lens and a negative meniscus lens with a concave surface directed towards the object in said order.

The zoom lens of the present invention is characterized the zoom lens is satisfied with the following conditions:

$$1.2 < f_1/f_w < 1.7 \quad (1)$$

$$1.5 < f_4/f_w < 1.65 \quad (2)$$

$$1.1 < f_{4F}/f_4 < 1.8 \quad (3)$$

$$0 < f_{4R} \quad (4)$$

$$0.14 < d_{17}/f_4 < 0.26 \quad (5)$$

$$1 < r_{18}/|r_{19}| < 5 \quad (6)$$

where
- $f_w$: shortest combined focal length
- $f_1$: focal length of the first group
- $f_4$: focal length of the fourth group
- $f_{4F}$: focal length of the fourth group F
- $f_{4R}$: focal length of the fourth group R
- $d_{17}$: distance above axis between the fourth group F and the fourth group R
- $r_{18}$: radius of curvature on the object side of the positive single lens of the fourth group R
- $r_{19}$: radius of curvature on the image side of the positive single lens of the fourth group R The condition (1) is the condition for miniaturizing the magnification changing system and maintaining good aberration. To miniaturize the magnification changing system, it is advantageous to reduce the focal length of the first group. If the focal length of the first group is reduced, the drawing-out amount of the first group for focusing decreases in the short-distance photographing and thus the amount of anticipation of the diameter of the front lens to be larger than the diameter required when the object is in the unlimited distant also decreases. However, if the $f_1$ exceeds the lower limit and becomes small, the high spherical aberration and coma aberration increase and it becomes difficult to carry out good correction of aberration. Conversely, if the $f_1$ exceeds the upper limit and becomes large, correction of aberration can be carried out advantageously but it is impossible to achieve the object of miniaturization.

The condition (2) is concerned with the focal length of the fourth group which is the release lens. To miniaturize the zoom lens, it is advantageous to determine the focal length of the release lens small as mentioned above. However, if the $f_4$ exceeds the lower limit and becomes small, the amount beared by the fourth group increases with respect to the ray of light on the axis incident through a large aperture and therefore the spherical aberration deteriorates. If the $f_4$ exceeds the upper limit, correction of the spherical aberration is carried out in good order but it becomes impossible to miniaturize the lens system, which is contrary to the object of the present invention.

The conditions (3) and (4) are concerned with the share of refractive power by the front group and rear group in the fourth group. The condition (3) is concerned with the refractive power of the fourth group F, which is the front group thereof. This condition is provided to make the telephoto ratio of the relay lens to 1.0 or less and to improve the spherical aberration. If the telephoto ratio exceeds the lower limit, it will be effective to reduce the telephoto ratio but the spherical aberration and other aberrations deteriorate. If the telephoto ratio exceeds the upper limit, the correction of aberration becomes better but the telephoto ratio of the relay lens also increases to render miniaturization as a whole system impossible.

The condition (4) is provided to decrease the telephoto ratio of the relay lens on the premise of the condition (3) and to correct various aberrations in good order. To form the relay lens into the telephoto type, in many cases, the positive refractive power of the front group of the relay lens is made stronger than the refractive power of the whole relay lens system and the refractive power of the rear group of the relay lens is made negative. However, such a structure leads to a tendency in which Petzval's sum of the relay lens is small and Petzval's sum of the whole zoom lens system is negative, making it difficult to enhance flatness of an image plane. In the present invention, the focal length of the fourth group F is set to the range greater than the $f_4$ (condition (3)) and the focal length of the rear group R in the fourth group is made positive to thereby increase the Petzval's sum of the relay lens and to correct the image plane of the whole zoom lens system in good order as well as to correct a positive distortion aberration resulting from the relay lens.

The condition (5) is provided to maintain the telephoto ratio of the fourth group which is the relay lens small to enhance the aberration. As described above, the fourth group R of the present invention has the positive refractive power. Accordingly, it is advantageous to make the distance $d_{17}$ between the fourth group F and the fourth group R small in the event the telephoto ratio is made small. However, if exceeding the lower limit to be small, the balance between the spherical aberration and the curve of the image plane fails to be obtained. When exceeding the upper limit, the telephoto ratio of the relay lens increases, failing to achieve miniaturization of the lens system.

The condition (6) is provided to maintain the balance between the curve of image plane of the fourth group which is the relay lens and the distortion aberration. When exceeding the lower limit, the distortion aberration is enhanced but the image plane is fallen towards the lens, resulting in a difficultly of correction. When exceeding the upper limit, the correction of the curve of image plane can be effected in good order but the positive distortion aberration increases.

DETAILED DESCRIPTION OF THE PREFERRED EMBODIMENTS

Figure 1:
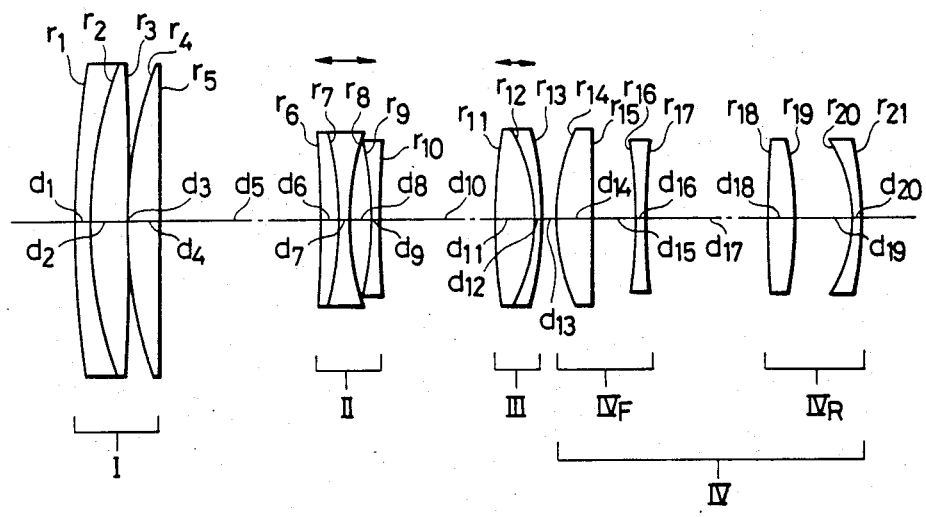
FIGS. 1 to 5 are respectively sectional views showing the constructions of embodiments 1 to 5 of the zoom lens in accordance with the present invention.
Figure 2:
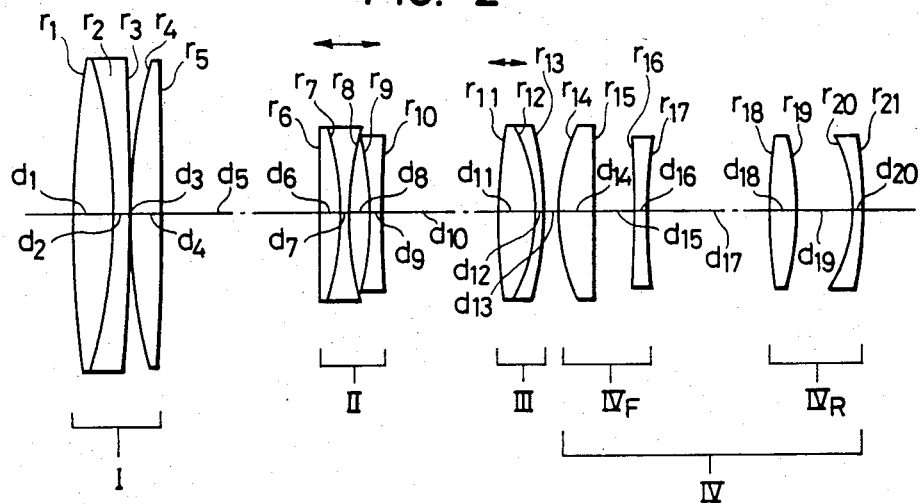
Figure 3:
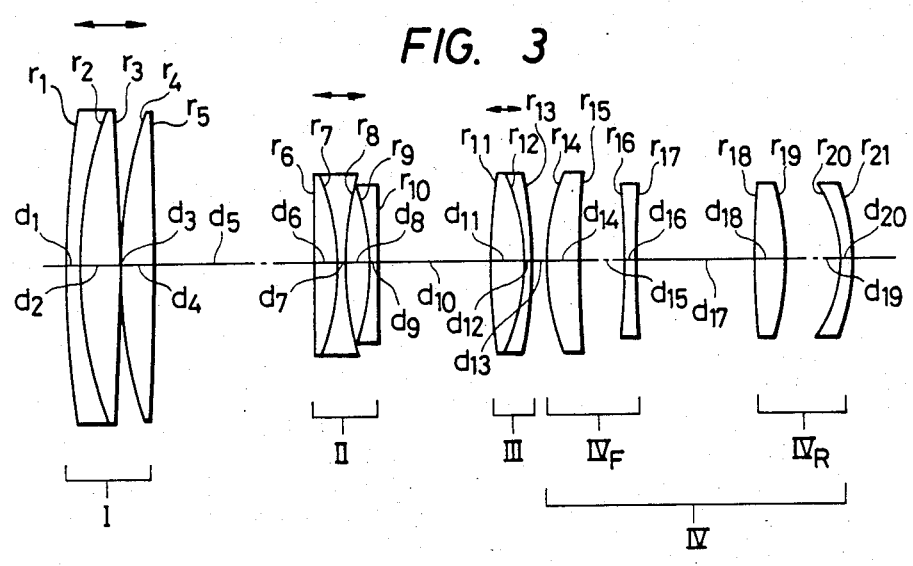
Figure 4:
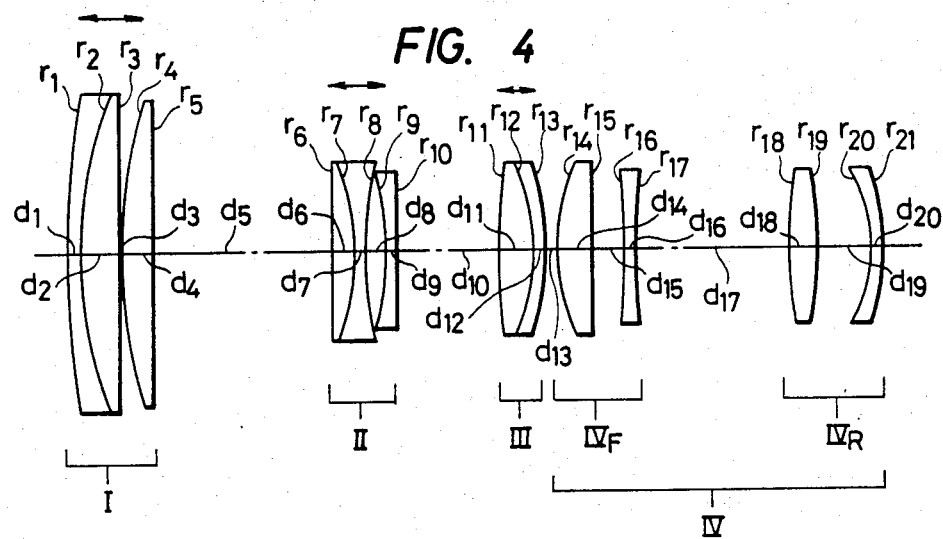
Figure 5:
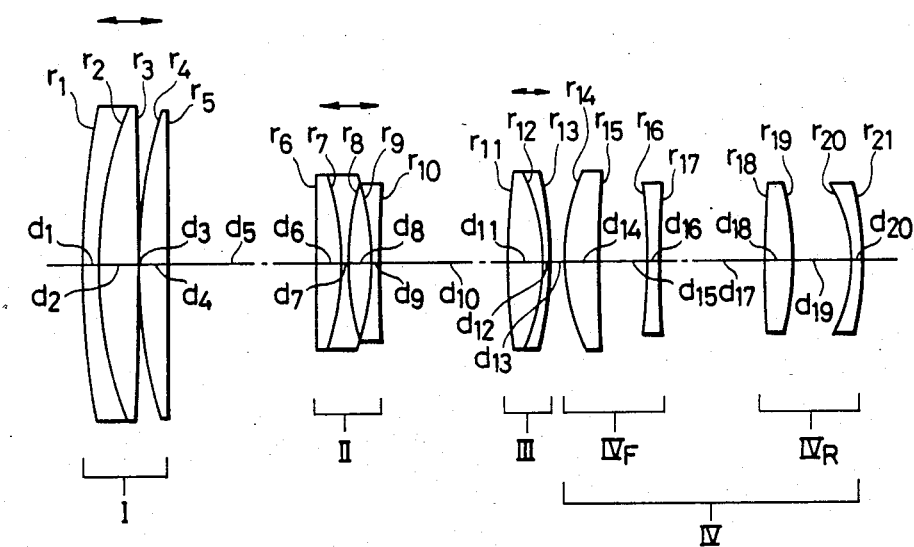

Five embodiments each comprising a magnification changing system composed of three groups of positive, negative and positive and a fourth group which is a relay lens composed of two groups and satisfying with all the conditions (1) to (6), as described above, will be given below, and their structural figures are shown in FIGS. 1 to 5, respectively. In the tables, a reference character r represents the radius of curvature of the refractive surface, d the distance between the refractive surfaces, n the refractive power of a glass material, $\nu$ the Abbe number, and bf the back-focus.

| Embodiment 1 $f = 71.7 - 204.0 \quad 1:4$ | | | |
|---|---|---|---|
| r1 = 165.681 | | | |
| | d1 = 2.50 | n1 = 1.76182 | $\nu$1 = 26.6 |
| r2 = 69.330 | | | |
| | d2 = 6.50 | n2 = 1.58913 | $\nu$2 = 61.3 |
| r3 = −1038.455 | | | |
| | d3 = 0.20 | | |
| r4 = 84.754 | | | |
| | d4 = 5.00 | n3 = 1.58913 | $\nu$3 = 61.3 |
| r5 = ∞ | | | |
| | d5 = variable | | |
| r6 = −312.400 | | | |
| | d6 = 3.60 | n4 = 1.84666 | $\nu$4 = 23.8 |
| r7 = −38.993 | | | |
| | d7 = 1.50 | n5 = 1.71300 | $\nu$5 = 53.9 |
| r8 = 51.610 | | | |
| | d8 = 3.80 | | |
| r9 = −45.354 | | | |
| | d9 = 1.50 | n6 = 1.69680 | $\nu$6 = 55.5 |
| r10 = 289.218 | | | |
| | d10 = variable | | |
| r11 = 116.180 | | | |
| | d11 = 6.10 | n7 = 1.56883 | $\nu$7 = 56.0 |
| r12 = −29.903 | | | |
| | d12 = 1.50 | n8 = 1.75520 | $\nu$8 = 27.5 |
| r13 = −56.514 | | | |
| | d13 = variable | | |
| r14 = 34.560 | | | |
| | d14 = 6.00 | n9 = 1.56883 | $\nu$9 = 56.0 |
| r15 = 529.240 | | | |
| | d15 = 7.22 | | |
| r16 = −116.180 | | | |
| | d16 = 2.00 | n10 = 1.80518 | $\nu$10 = 25.5 |
| r17 = 170.977 | | | |
| | d17 = 20.31 | | |
| r18 = 137.015 | | | |
| | d18 = 5.00 | n11 = 1.58144 | $\nu$11 = 40.9 |
| r19 = −52.829 | | | |
| | d19 = 9.48 | | |
| r20 = −25.220 | | | |
| | d20 = 2.0 | n12 = 1.71300 | $\nu$12 = 53.9 |
| r21 = −50.500 | | | |

| di | f | | |
|---|---|---|---|
| | 71.7 | 120.941 | 204.0 |
| d5 | 2.676 | 27.670 | 42.488 |
| d10 | 30.909 | 19.949 | 1.462 |
| d13 | 16.247 | 2.213 | 5.882 |

| | |
|---|---|
| f1 = 105.0 | $f_4$ = 112.5 |
| $f_{4F}$ = 169.654 | $f_4R$ = 302.143 |
| bf = 57.561 | |

Telephoto ratio of relay lens = 0.974
Telephoto ratio of whole system = 0.939

| Embodiment 2 $f = 71.7 - 204.0 \quad 1:4$ | | | |
|---|---|---|---|
| r1 = 184.968 | | | |
| | d1 = 7.00 | n1 = 1.62041 | $\nu$1 = 60.3 |
| r2 = −94.740 | | | |
| | d2 = 2.50 | n2 = 1.76182 | $\nu$2 = 26.6 |
| r3 = −518.706 | | | |
| | d3 = 0.20 | | |
| r4 = 99.147 | | | |
| | d4 = 5.00 | n3 = 1.58913 | $\nu$3 = 61.3 |
| r5 = −1555.363 | | | |

-continued

Embodiment 2
f = 71.7 − 204.0  1:4

| | | | |
|---|---|---|---|
| | d5 = variable | | |
| r6 = −452.830 | d6 = 3.60 | n4 = 1.84666 | ν4 = 23.8 |
| r7 = −40.114 | d7 = 1.50 | n5 = 1.71300 | ν5 = 53.9 |
| r8 = 52.458 | d8 = 3.80 | | |
| r9 = −45.683 | d9 = 1.50 | n6 = 1.69680 | ν6 = 55.5 |
| r10 = 196.493 | d10 = variable | | |
| r11 = 114.506 | d11 = 6.10 | n7 = 1.56883 | ν7 = 56.0 |
| r12 = −29.752 | d12 = 1.50 | n8 = 1.75520 | ν8 = 27.5 |
| r13 = −56.679 | d13 = variable | | |
| r14 = 35.204 | d14 = 6.00 | n9 = 1.56883 | ν9 = 56.0 |
| r15 = 1173.735 | d15 = 7.22 | | |
| r16 = −123.391 | d16 = 2.00 | n10 = 1.80518 | ν10 = 25.2 |
| r17 = 155.123 | d17 = 20.31 | | |
| r18 = 106.299 | d18 = 5.00 | n11 = 1.58144 | ν11 = 40.9 |
| r19 = −56.271 | d19 = 9.48 | | |
| r20 = −25.930 | d20 = 2.00 | n12 = 1.71300 | ν12 = 53.9 |
| r21 = −59.324 | | | |

| | f | | |
|---|---|---|---|
| di | 71.7 | 120.941 | 204.0 |
| d5 | 2.339 | 27.333 | 42.151 |
| d10 | 31.158 | 20.198 | 1.711 |
| d13 | 16.234 | 2.200 | 5.869 |

$f_1 = 105.0$  $f_4 = 112.5$
$f_{4A} = 163.958$  $f_{4R} = 356.036$
$bf = 55.895$

Telephoto ratio of relay lens = 0.959
Telephoto ratio of whole system = 0.933

Embodiment 3
f = 72.0 − 205.0  1:4

| | | | |
|---|---|---|---|
| r1 = 181.497 | d1 = 2.50 | n1 = 1.76182 | ν1 = 26.6 |
| r2 = 72.645 | d2 = 6.45 | n2 = 1.58913 | ν2 = 613. |
| r3 = −702.670 | d3 = 0.20 | | |
| r4 = 82.059 | d4 = 5.20 | n3 = 1.58913 | ν3 = 61.3 |
| r5 = 3277.440 | d5 = variable | | |
| r6 = −343.864 | d6 = 3.58 | n4 = 1.84666 | ν4 = 23.8 |
| r7 = −39.041 | d7 = 1.50 | n5 = 1.71300 | ν5 = 53.9 |
| r8  51.689 | d8 = 3.78 | | |
| r9 = −44.877 | d9 = 1.50 | n6 = 1.69680 | ν6 = −55.5 |
| r10 = 264.786 | d10 = variable | | |
| r11 = 112.320 | d11 = 5.80 | n7 = 1.56883 | ν7 = 56.0 |
| r12 = −29.355 | d12 = 1.45 | n8 = 1.75520 | ν8 = 27.5 |
| r13 = −56.261 | d13 = variable | | |
| r14 = 36.247 | d14 = 6.00 | n9 = 1.56883 | ν9 = 56.0 |
| r15 = 675.795 | d15 = 7.18 | | |
| r16 = −138.188 | d16 = 2.00 | n10 = 1.80518 | ν10 = 25.2 |
| r17 = 172.386 | d17 = 20.40 | | |
| r18 = 171.169 | d18 = 5.00 | n11 = 1.58144 | ν11 = 40.9 |
| r19 = −54.411 | d19 = 9.48 | | |
| r20 = −25.620 | d20 = 1.80 | n12 = 1.71300 | ν12 = 53.9 |
| r21 = −48.663 | | | |

| | f | | |
|---|---|---|---|
| di | 72.0 | 121.491 | 205.0 |
| d5 | 2.125 | 27.179 | 42.027 |
| d10 | 30.606 | 19.727 | 1.369 |
| d13 | 16.374 | 2.200 | 5.710 |

$f_1 = 104.5$  $f_4 = 113.0$
$f_{4F} = 161.038$  $f_{4R} = 353.497$
$bf = 58.513$

Telephoto ratio of relay lens = 0.977
Telephoto ratio of whole system = 0.934

Embodiment 4
f = 71.7 − 204.0  1:4

| | | | |
|---|---|---|---|
| r1 = 171.568 | d1 = 2.50 | n1 = 1.76812 | ν1 = 26.6 |
| r2 = 73.817 | d2 = 6.50 | n2 = 1.58913 | ν2 = 61.3 |
| r3 = −925.039 | d3 = 0.20 | | |
| r4 = 91.728 | d4 = 5.00 | n3 = 1.58913 | ν3 = 61.3 |
| r5 = 4098.140 | d5 = variable | | |
| r6 = −296.480 | d6 = 3.60 | n4 = 1.84666 | ν4 = 23.8 |
| r7 = −38.434 | d7 = 1.50 | n5 = 1.71300 | ν5 = 53.9 |
| r8 = 51.623 | d8 = 3.80 | | |
| r9 = −44.924 | d9 = 1.50 | n6 = 1.69680 | ν6 = 55.5 |
| r10 = 321.940 | d10 = variable | | |
| r11 = 110.569 | d11 = 6.10 | n7 = 1.56883 | ν7 = 56.0 |
| r12 = −29.017 | d12 = 1.50 | n8 = 1.75520 | ν8 = 27.5 |
| r13 = −53.653 | d13 = variable | | |
| r14 = 34.525 | d14 = 6.00 | n9 = 1.56883 | ν9 = 56.0 |
| r15 = 2109.995 | d15 = 5.61 | | |
| r16 = −119.345 | d16 = 1.97 | n10 = 1.80518 | ν10 = 25.5 |
| r17 = 190.289 | d17 = 25.96 | | |
| r18 = 98.760 | d18 = 4.93 | n11 = 1.58144 | ν11 = 40.9 |
| r19 = −67.111 | d19 = 8.81 | | |
| r20 = −26.478 | d20 = 1.97 | n12 = 1.71300 | ν12 = 53.9 |
| r21 = −59.678 | | | |

| | f | | |
|---|---|---|---|
| di | 71.7 | 121.491 | 204.0 |
| d5 | 2.268 | 30.238 | 46.820 |
| d10 | 27.564 | 17.770 | 1.249 |
| d13 | 20.376 | 2.200 | 2.138 |

$f_1 = 112.0$  $f_4 = 111.0$

-continued

Embodiment 4
f = 71.7 — 204.0   1:4

| $f_{4F}$ = 143.17 | $f_{4F}$ = 586.654 |
|---|---|
| bf = 52.487 | |

Telephoto ratio of relay lens = 0.977
Telephoto ratio of whole system = 0.932

Embodiment 5
f = 71.7 — 204,0   1:4

| r1 = 154.293 | | | |
|---|---|---|---|
| | d1 = 2.50 | n1 = 1.76182 | ν1 = 26.6 |
| r2 = 65.116 | | | |
| | d2 = 6.50 | n2 = 1.58913 | ν2 = 61.3 |
| r3 = −1522.571 | | | |
| | d3 = 0.20 | | |
| r4 = 80.244 | | | |
| | d4 = 5.00 | n3 = 1.58913 | ν3 = 61.3 |
| r5 = −5708.864 | | | |
| | d5 = variable | | |
| r6 = −333.960 | | | |
| | d6 = 3.60 | n4 = 1.84666 | ν4 = 23.8 |
| r7 = −39.227 | | | |
| | d7 = 1.50 | n5 = 1.71300 | ν5 = 53.9 |
| r8 = 51.211 | | | |
| | d8 = 3.80 | | |
| r9 = −44.78 | | | |
| | d9 = 1.50 | n6 = 1.69680 | ν6 = 55.5 |
| r10 = 282.575 | | | |
| | d10 = variable | | |
| r11 = 118.323 | | | |
| | d11 = 6.10 | n7 = 1.56883 | ν7 = 56.0 |
| r12 = −30.924 | | | |
| | d12 = 1.50 | n8 = 1.75520 | ν8 = 27.5 |
| r13 = −58.869 | | | |
| | d13 = variable | | |
| r14 = 34.097 | | | |
| | d14 = 6.16 | n9 = 1.56883 | ν9 = 56.0 |
| r15 = 337.322 | | | |
| | d15 = 7.90 | | |
| r16 = −110.854 | | | |
| | d16 = 2.05 | n10 = 1.80518 | ν10 = 25.5 |
| r17 = 172.807 | | | |
| | d17 = 17.46 | | |
| d18 = 115.539 | | | |
| | d18 = 5.14 | n11 = 1.58144 | ν11 = 40.9 |
| r19 = −51.306 | | | |
| | d19 = 9.97 | | |
| r20 = −24.684 | | | |
| | d20 = 2.05 | n12 = 1.71300 | ν12 = 53.9 |
| r21 = −52.917 | | | |

| | f | | |
|---|---|---|---|
| di | 71.7 | 120.941 | 204.0 |
| d5 | 2.380 | 25.521 | 39.240 |
| d10 | 33.118 | 21.431 | 1.718 |
| d13 | 13.654 | 2.200 | 8.194 |

| $f_1$ = 100.0 | $f_4$ = 114.0 |
|---|---|
| $f_{4F}$ = 183.941 | $f_{4R}$ = 275.568 |
| bf = 58.318 | |

Telephoto ratio of relay lens = 0.957
Telephoto ratio of whole system = 0.933

Figure 6:
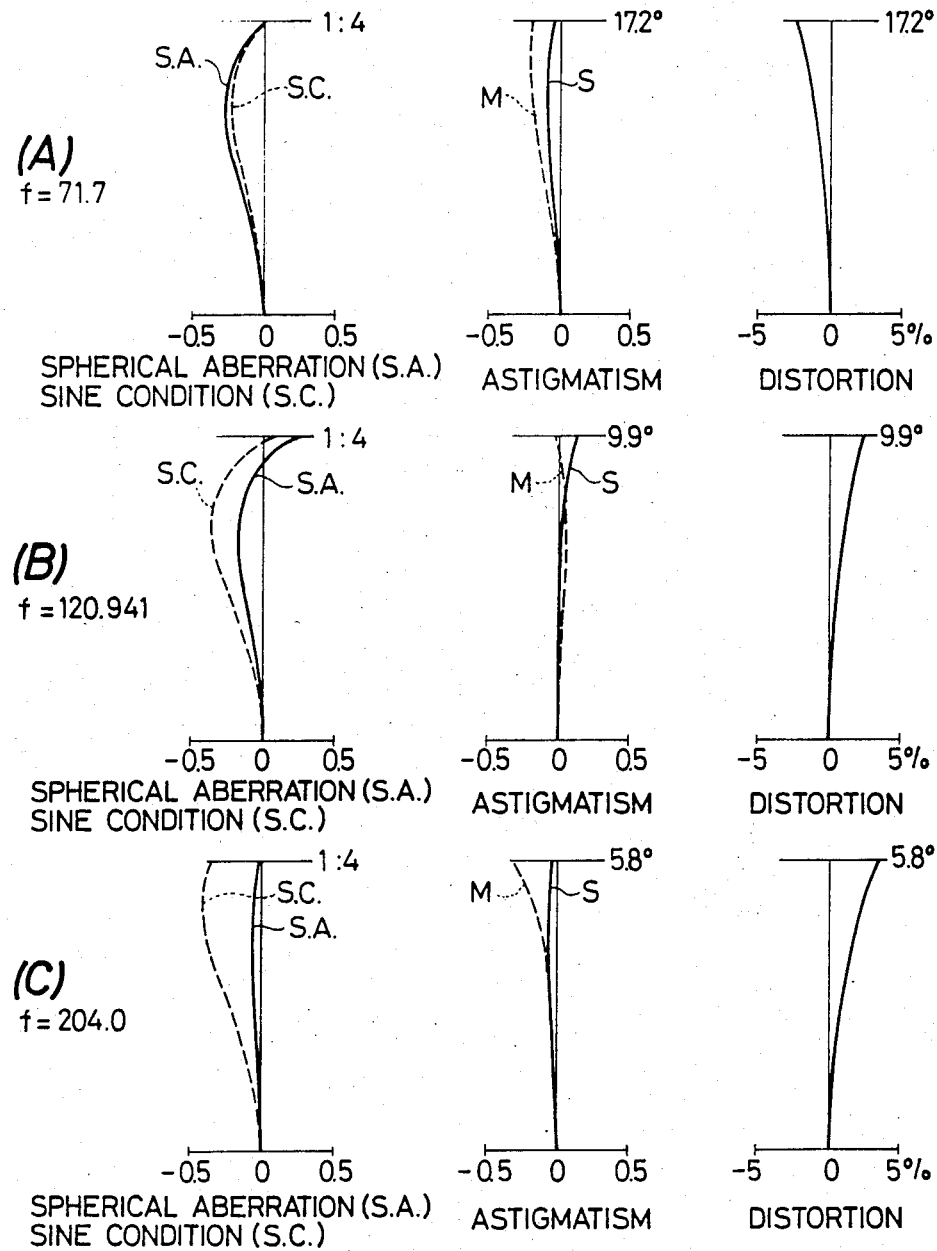
FIGS. 6 to 10 (A, B and C) are respectively aberration curves in embodiments 1 to 5.
Figure 7:
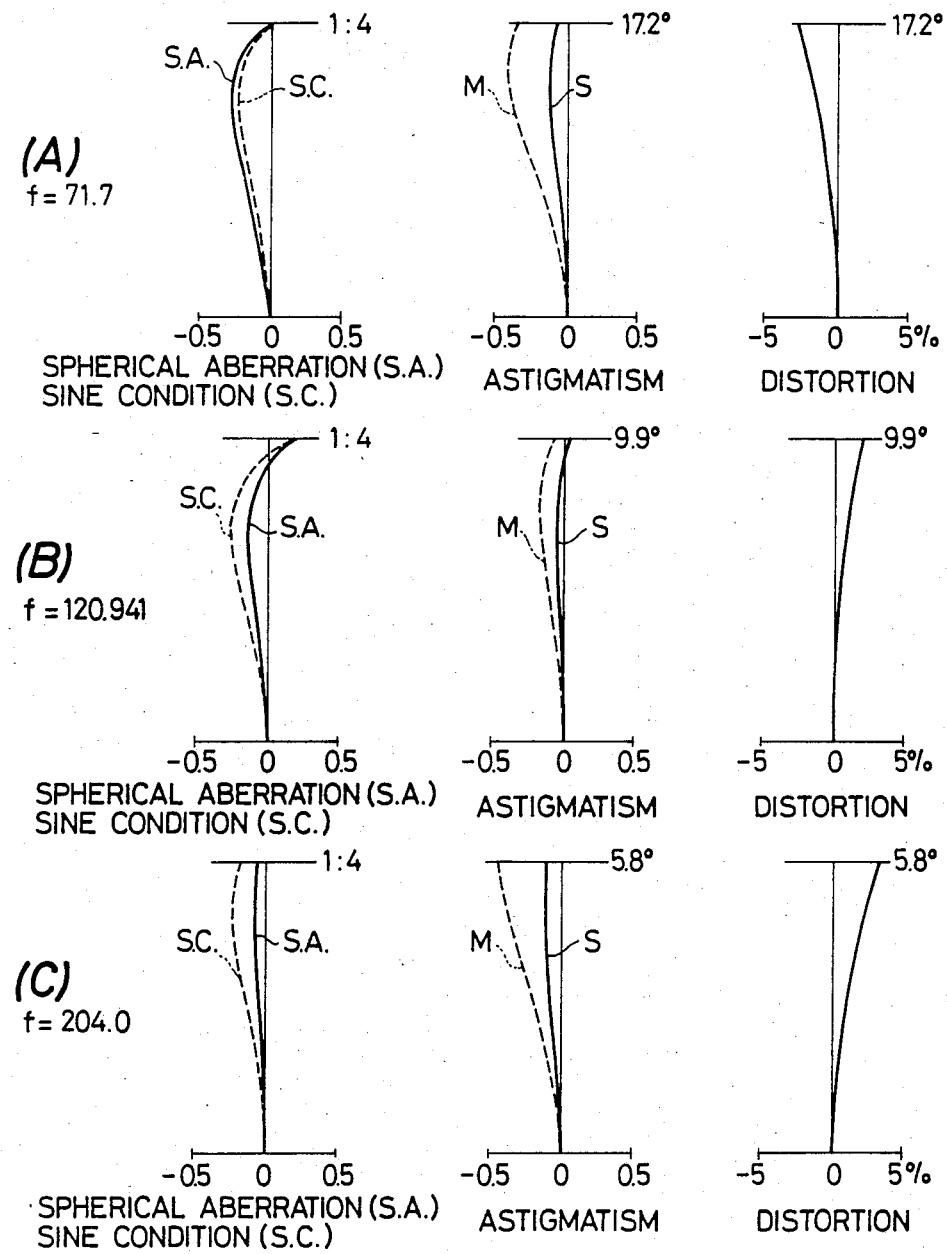
Figure 8:
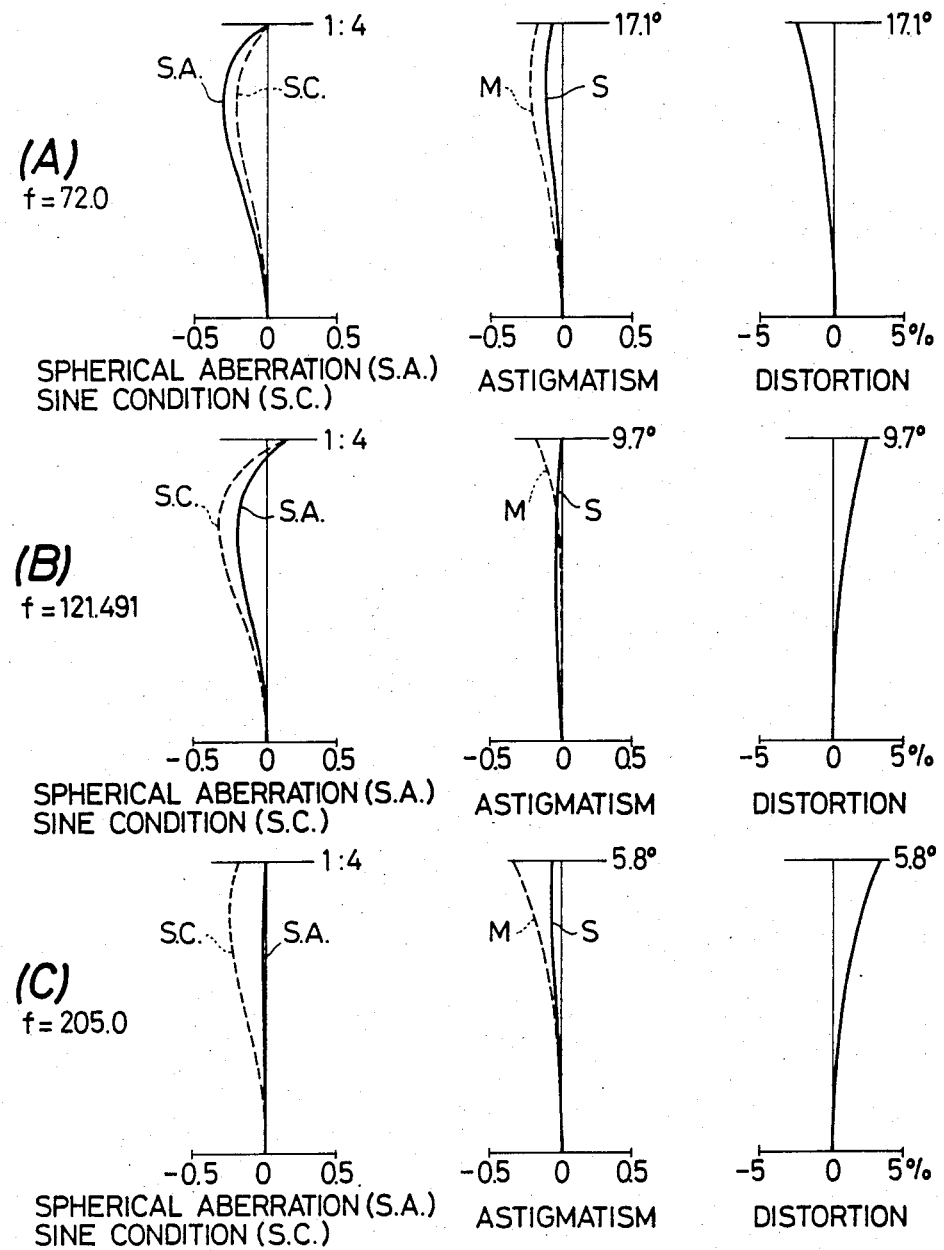
Figure 9:
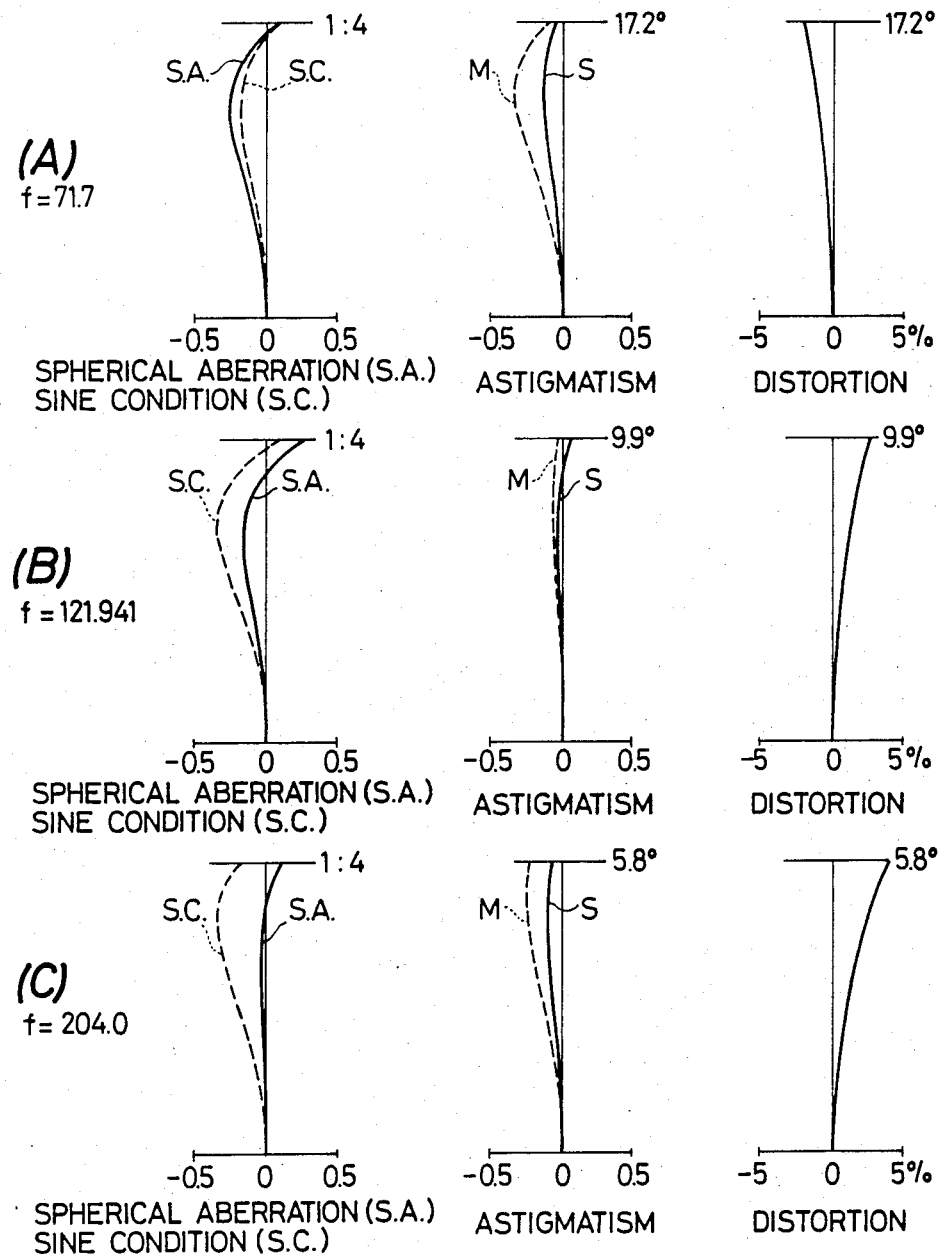
Figure 10:
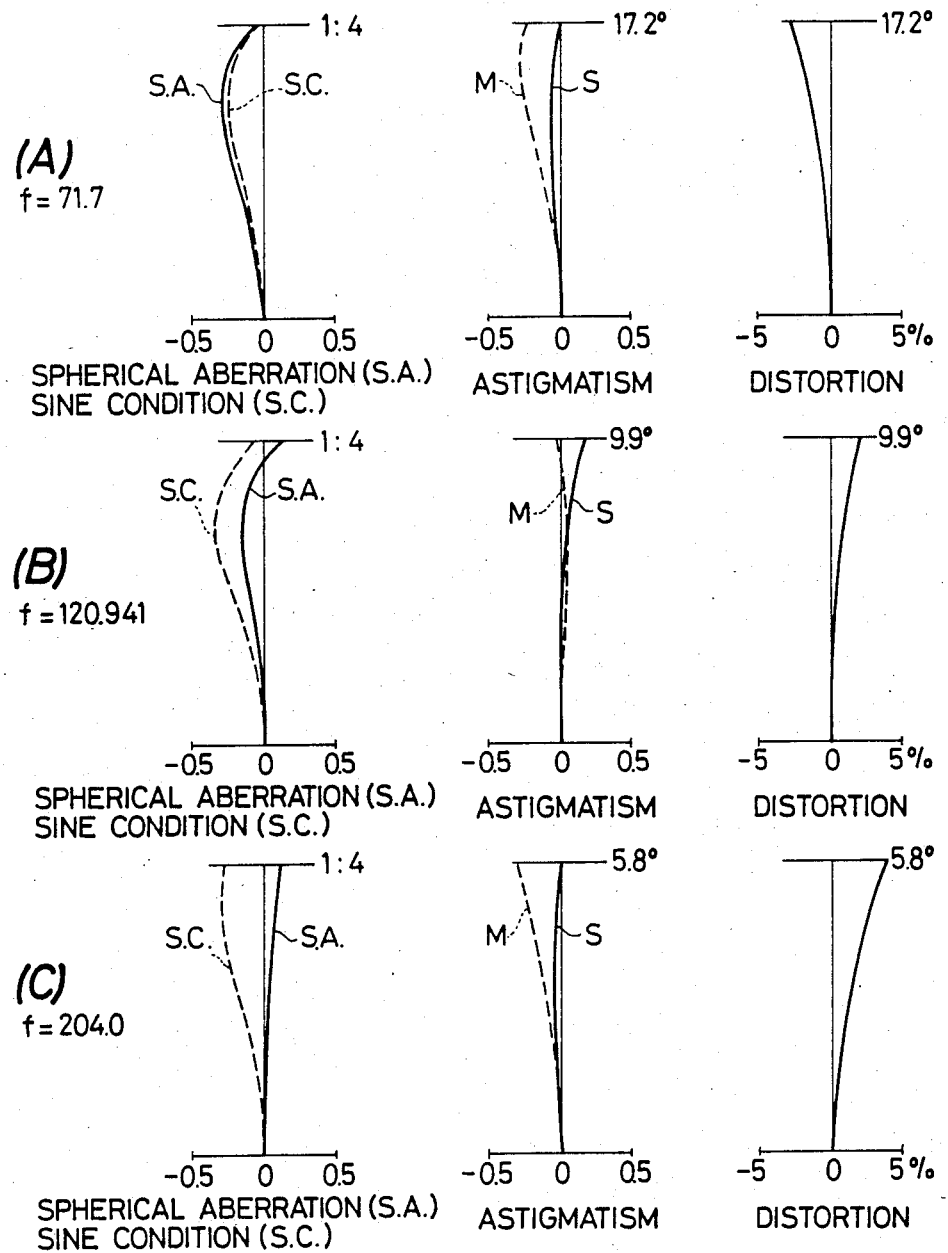

Aberration curves of Embodiments 1 to 5 are shown in FIGS. 6 to 10. In the figures, A, B and C are the aberration curves in the shortest focal length, middle focal length and longest focal length, respectively. As can be seen in these aberration curves, each of aberrations are well corrected in the whole magnification changing region despite the fact that the telephoto ratio is small, less than 0.94.

What is claimed is:

1. A zoom lens comprising, in order from the object side, a magnification changing system which comprises a first group having a positive refractive power and being moved on the optical axis for focusing, a second group in the form of a variater having a negative refractive power and moving on the optical axis in zooming to principally convert the focal length and a third group in the form of a compensator having a positive refractive power to maintain constant an image plane varied by movement of the second group, and a fourth group in the form of a relay lens system next to said magnification changing system, said first group comprising a cemented converging lens composed of single lenses of opposite refractive powers disposed in order from the object side and a positive single lens, said second group comprising a cemented negative lens composed of a positive lens and a biconcave negative lens disposed in order from the object side and a negative single lens, said third group comprising a cemented converging lens component comprising a positive single lens and a negative single lens, said fourth group comprising a fourth group F composed, in order from the object side, a positive single lens with a strong convex surface directed towards the object and a negative single lens next thereto and a fourth group R composed of a positive single lens and a negative meniscus lens with a concave surface directed towards the object arranged in said order, characterized in that the zoom lens is satisfied with the following conditions:

$$1.2 < f_1/f_w < 1.7 \quad (1)$$

$$1.5 < f_4/f_w < 1.65 \quad (2)$$

$$1.1 < f_{4F}/f_4 < 1.8 \quad (3)$$

$$0 < f_{4R} \quad (4)$$

$$0.14 < d_{17}/f_4 < 0.26 \quad (5)$$

$$1 < r_{18}/|r_{19}| < 5 \quad (6)$$

where
$f_w$: shortest combined focal length
$f_1$: focal length of the first group
$f_4$: focal length of the fourth group
$f_{4F}$: focal length of the fourth group F
$f_{4R}$: focal length of the fourth group R
$d_{17}$: distance above axis between the fourth group F and the fourth group R
$r_{18}$: radius of curvature on the object side of the positive single lens of the fourth group R
$r_{19}$: radius of curvature on the image side of the positive single lens of the fourth group R.

2. A zoom lens of claim 1 having the data as follows:

f = 71.7 — 204.70   1:4

| r1 = 165.681 | | | |
|---|---|---|---|
| | d1 = 2.50 | n1 = 1.76182 | ν1 = 26.6 |
| r2 = 69.330 | | | |
| | d2 = 6.50 | n2 = 1.58913 | ν2 = 61.3 |
| r3 = −1038.455 | | | |
| | d3 = 0.20 | | |
| r4 = 84.754 | | | |
| | d4 = 5.00 | n3 = 1.58913 | ν3 = 61.3 |
| r5 = ∞ | | | |
| | d5 = variable | | |
| r6 = −312.400 | | | |
| | d6 = 3.60 | n4 = 1.84666 | ν4 = 23.8 |
| r7 = −38.993 | | | |
| | d7 = 1.50 | n5 = 1.71300 | ν5 = 53.9 |
| r8 = 51.610 | | | |
| | d8 = 3.80 | | |
| r9 = −45.354 | | | |

-continued

| f = 71.7 − 204.70  1:4 | | | |
|---|---|---|---|
| r10 = 289.218 | d9 = 1.50 | n6 = 1.69680 | ν6 = 55.5 |
| r11 = 116.180 | d10 = variable | | |
| r12 = −29.903 | d11 = 6.10 | n7 = 1.56883 | ν7 = 56.0 |
| r13 = −56.514 | d12 = 1.50 | n8 = 1.75520 | ν8 = 27.5 |
| r14 = 34.560 | d13 = variable | | |
| r15 = 529.240 | d14 = 6.00 | n9 = 1.56883 | ν9 = 56.0 |
| r16 = −116.180 | d15 = 7.22 | | |
| r17 = 170.977 | d16 = 2.00 | n10 = 1.80518 | ν10 = 25.5 |
| r18 = 137.015 | d17 = 20.31 | | |
| r19 = −52.829 | d18 = 5.00 | n11 = 1.58144 | ν11 = 40.9 |
| r20 = −25.220 | d19 = 9.48 | | |
| r21 = −50.500 | d20 = 2.0 | n12 = 1.71300 | ν12 = 53.9 |

| di | f | | |
|---|---|---|---|
| | 71.7 | 120.941 | 204.0 |
| d5 | 2.676 | 27.670 | 42.488 |
| d10 | 30.909 | 19.949 | 1.462 |
| d13 | 16.247 | 2.213 | 5.882 | f₁ = 105.0   f₄ = 112.5
f₄F = 169.654   f₄R = 302.143
bf = 57.561

Telephoto ratio of relay lens = 0.974
Telephoto ratio of whole system = 0.939

3. A zoom lens of claim 2 having the data as follows:

| f = 71.7 − 204.0  1:4 | | | |
|---|---|---|---|
| r1 = 184.968 | d1 = 7.00 | n1 = 1.62041 | ν1 = 60.3 |
| r2 = −94.740 | d2 = 2.50 | n2 = 1.76182 | ν2 = 26.6 |
| r3 = −518.706 | d3 = 0.20 | | |
| r4 = 99.147 | d4 = 5.00 | n3 = 1.58913 | ν3 = 61.3 |
| r5 = −1555.363 | d5 = variable | | |
| r6 = −452.830 | d6 = 3.60 | n4 = 1.84666 | ν4 = 23.8 |
| r7 = −40.114 | d7 = 1.50 | n5 = 1.71300 | ν5 = 53.9 |
| r8 = 52.458 | d8 = 3.80 | | |
| r9 = −45.683 | d9 = 1.50 | n6 = 1.69680 | ν6 = 55.5 |
| r10 = 196.493 | d10 = variable | | |
| r11 = 114.506 | d11 = 6.10 | n7 = 1.56883 | ν7 = 56.0 |
| r12 = −29.752 | d12 = 1.50 | n8 = 1.75520 | ν8 = 27.5 |
| r13 = −56.679 | d13 = variable | | |
| r14 = 35.204 | d14 = 6.00 | n9 = 1.56883 | ν9 = 56.0 |
| r15 = 1173.735 | d15 = 7.22 | | |
| r16 = −123.391 | d16 = 2.00 | n10 = 1.80518 | ν10 = 25.2 |
| r17 = 155.123 | d17 = 20.31 | | |
| r18 = 106.299 | d18 = 5.00 | n11 = 1.58144 | ν11 = 40.9 |
| r19 = −56.271 | | | |

-continued

| f = 71.7 − 204.0  1:4 | | | |
|---|---|---|---|
| r20 = −25.930 | d19 = 9.48 | | |
| r21 = −59.324 | d20 = 2.00 | n12 = 1.71300 | ν12 = 53.9 |

| di | f | | |
|---|---|---|---|
| | 71.7 | 120.941 | 204.0 |
| d5 | 2.339 | 27.333 | 42.151 |
| d10 | 31.158 | 20.198 | 1.711 |
| d13 | 16.234 | 2.200 | 5.869 | f₁ = 105.0   f₄ = 112.5
f₄A = 163.958   f₄R = 356.036
bf = 55.895

Telephoto ratio of relay lens = 0.959
Telephoto ratio of whole system = 0.933

4. A zoom lens of claim 2 having the data as follows:

| f = 72.0 − 205.0  1:4 | | | |
|---|---|---|---|
| r1 = 181.497 | d1 = 2.50 | n1 = 1.76182 | ν1 = 26.6 |
| r2 = 72.645 | d2 = 6.45 | n2 = 1.58913 | ν2 = 613. |
| r3 = −702.670 | d3 = 0.20 | | |
| r4 = 82.059 | d4 = 5.20 | n3 = 1.58913 | ν3 = 61.3 |
| r5 = 3277.440 | d5 = variable | | |
| r6 = −343.864 | d6 = 3.58 | n4 = 1.84666 | ν4 = 23.8 |
| r7 = −39.041 | d7 = 1.50 | n5 = 1.71300 | ν5 = 53.9 |
| r8  51.689 | d8 = 3.78 | | |
| r9 = −44.877 | d9 = 1.50 | n6 = 1.69680 | ν6 = 55.5 |
| r10 = 64.786 | d10 = variable | | |
| r11 = 112.320 | d11 = 5.80 | n7 = 1.56883 | ν7 = 56.0 |
| r12 = −29.355 | d12 = 1.45 | n8 = 1.75520 | ν8 = 27.5 |
| r13 = −56.261 | d13 = variable | | |
| r14 = 36.247 | d14 = 6.00 | n9 = 1.56883 | ν9 = 56.0 |
| r15 = 675.795 | d15 = 7.18 | | |
| r16 = −138.188 | d16 = 2.00 | n10 = 1.80518 | ν10 = 25.2 |
| r17 = 172.386 | d17 = 20.40 | | |
| r18 = 171.169 | d18 = 5.00 | n11 = 1.58144 | ν11 = 40.9 |
| r19 = −54.411 | d19 = 9.48 | | |
| r20 = −25.620 | d20 = 1.80 | n12 = 1.71300 | ν12 = 53.9 |
| r21 = −48.663 | | | |

| di | f | | |
|---|---|---|---|
| | 72.0 | 121.491 | 205.0 |
| d5 | 2.125 | 27.179 | 42.027 |
| d10 | 30.606 | 19.727 | 1.369 |
| d13 | 16.374 | 2.200 | 5.710 | f₁ = 104.5   f₄ = 113.0
f₄F = 161.038   f₄R = 353.497
bf = 58.513

Telephoto ratio of relay lens = 0.977
Telephoto ratio of whole system = 0.934

5. A zoom lens of claim 2 having the data as follows:

| f = 71.7 – 204.0   1:4 ||||
|---|---|---|---|
| r1 = 171.568 | | | |
| | d1 = 2.50 | n1 = 1.76812 | ν1 = 26.6 |
| r2 = 73.817 | | | |
| | d2 = 6.50 | n2 = 1.58913 | ν2 = 61.3 |
| r3 = −925.039 | | | |
| | d3 = 0.20 | | |
| r4 = 91.728 | | | |
| | d4 = 5.00 | n3 = 1.58913 | ν3 = 61.3 |
| r5 = 4098.140 | | | |
| | d5 = variable | | |
| r6 = −296.480 | | | |
| | d6 = 3.60 | n4 = 1.84666 | ν4 = 23.8 |
| r7 = −38.434 | | | |
| | d7 = 1.50 | n5 = 1.71300 | ν5 = 53.9 |
| r8 = 51.623 | | | |
| | d8 = 3.80 | | |
| r9 = −44.924 | | | |
| | d9 = 1.50 | n6 = 1.69680 | ν6 = 55.5 |
| r10 = 321.940 | | | |
| | d10 = variable | | |
| r11 = 110.569 | | | |
| | d11 = 6.10 | n7 = 1.56883 | ν7 = 56.0 |
| r12 = −29.017 | | | |
| | d12 = 1.50 | n8 = 1.75520 | ν8 = 27.5 |
| r13 = −53.653 | | | |
| | d13 = variable | | |
| r14 = 34.525 | | | |
| | d14 = 6.00 | n9 = 1.56883 | ν9 = 56.0 |
| r15 = 2109.995 | | | |
| | d15 = 5.61 | | |
| r16 = −119.345 | | | |
| | d16 = 1.97 | n10 = 1.80518 | ν10 = 25.5 |
| r17 = 190.289 | | | |
| | d17 = 25.96 | | |
| r18 = 98.760 | | | |
| | d18 = 4.93 | n11 = 1.58144 | ν11 = 40.9 |
| r19 = −67.111 | | | |
| | d19 = 8.81 | | |
| r20 = −26.478 | | | |
| | d20 = 1.97 | n12 = 1.71300 | ν12 = 53.9 |
| r21 = −59.678 | | | |

| | f |||
|---|---|---|---|
| di | 71.7 | 121.491 | 204.0 |
| d5 | 2.268 | 30.238 | 46.820 |
| d10 | 27.564 | 17.770 | 1.249 |
| d13 | 20.376 | 2.200 | 2.138 |

$f_1 = 112.0$     $f_4 = 111.0$
$f_{4F} = 143.17$     $f_{4F} = 586.654$
$bf = 52.487$

Telephoto ratio of relay lens = 0.977
Telephoto ratio of whole system = 0.932

6. A zoom lens of claim 2 having the data as follows:

| f = 71.7 – 204.0   1:4 ||||
|---|---|---|---|
| r1 = 154.293 | | | |
| | d1 = 2.50 | n1 = 1.76182 | ν1 = 26.6 |
| r2 = 65.116 | | | |
| | d2 = 6.50 | n2 = 1.58913 | ν2 = 61.3 |
| r3 = −1522.571 | | | |
| | d3 = 0.20 | | |
| r4 = 80.244 | | | |
| | d4 = 5.00 | n3 = −1.58913 | ν3 = 61.3 |
| r5 = −5708.864 | | | |
| | d5 = variable | | |
| r6 = −333.960 | | | |
| | d6 = 3.60 | n4 = 1.84666 | ν4 = −23.8 |
| r7 = −39.227 | | | |
| | d7 = 1.50 | n5 = 1.71300 | ν5 = 53.9 |
| r8 = 51.211 | | | |
| | d8 = 3.80 | | |
| r9 = −44.78 | | | |
| | d9 = 1.50 | n6 = 1.69680 | ν6 = 55.5 |
| r10 = 282.575 | | | |
| | d10 = variable | | |
| r11 = 118.323 | | | |
| | d11 = 6.10 | n7 = 1.56883 | ν7 = 56.0 |
| r12 = −30.924 | | | |
| | d12 = 1.50 | n8 = 1.75520 | ν8 = 27.5 |
| r13 = −58.869 | | | |
| | d13 = variable | | |
| r14 = 34.097 | | | |
| | d14 = 6.16 | n9 = 1.56883 | ν9 = 56.0 |
| r15 = 337.322 | | | |
| | d15 = 7.90 | | |
| r16 = −110.854 | | | |
| | d16 = 2.05 | n10 = 1.80518 | ν10 = 25.5 |
| r17 = 172.807 | | | |
| | d17 = 17.46 | | |
| r18 = 115.539 | | | |
| | d18 = 5.14 | n11 = 1.58144 | ν11 = 40.9 |
| r19 = −51.306 | | | |
| | d19 = 9.97 | | |
| r20 = −24.684 | | | |
| | d20 = 2.05 | n12 = 1.71300 | ν12 = 53.9 |
| r21 = −52.917 | | | |

| | f |||
|---|---|---|---|
| di | 71.7 | 120.941 | 204.0 |
| d5 | 2.380 | 25.521 | 39.240 |
| d10 | 33.118 | 21.431 | 1.718 |
| d13 | 13.654 | 2.200 | 8.194 |

$f_1 = 100.0$     $f_4 = 114.0$
$f_{4F} = 183.941$     $f_4^R = 275.568$
$bf = 58.318$

Telephoto ratio of relay lens = 0.957
Telephoto ratio of whole system = 0.933

* * * * *